United States Patent [19]

Kemp

[11] Patent Number: 4,531,045

[45] Date of Patent: Jul. 23, 1985

[54] TRIGGER HOLD CIRCUIT FOR WELDING POWER SUPPLY

[75] Inventor: Gerrit V. Kemp, Troy, Ohio

[73] Assignee: Hobart Brothers Company, Troy, Ohio

[21] Appl. No.: 624,888

[22] Filed: Jun. 27, 1984

[51] Int. Cl.³ .............................................. B23K 9/10
[52] U.S. Cl. .................................... 219/132; 219/136
[58] Field of Search .................... 219/132, 136, 137.31

[56] References Cited

U.S. PATENT DOCUMENTS

| | | |
|---|---|---|
| 2,776,361 | 1/1957 | Essig. |
| 2,871,336 | 1/1959 | Lobosco et al. |
| 3,662,147 | 5/1972 | Ogden, Sr. et al. |
| 4,147,919 | 4/1979 | Matasovic. |
| 4,283,618 | 8/1981 | Jakob ................................. 219/132 |

FOREIGN PATENT DOCUMENTS 58-3787 1/1983 Japan .................................... 219/132

Primary Examiner—Clifford C. Shaw
Attorney, Agent, or Firm—Biebel, French & Nauman

[57] ABSTRACT

A control circuit for an electric arc welder is responsive to the operation of a torch or gun mounted control switch. A first comparator has one input connected to the gun switch and the other input to a reference voltage source. When the gun switch is closed, the output of the comparator will cause a control relay to be energized. When a welding arc is established, a reed switch closes and provides an input to a second comparator which effectively provides a latch to hold the control relay energized. After a predetermined time delay, typically in the order of 1 second, a timer circuit will provide an output to one input of a third comparator, the other input of which is connected to the gun switch. A subsequent closure of the gun switch will caused the output of the third comparator to change the level of the reference voltage, changing the outputs of the first two comparators, thereby removing the latch and deenergizing the control relay. Thus, the control relay can be deenergized either by the welder operating the control switch a second time or by extinguishing the arc, such as by removing the torch from the workpiece; either will disable the latch circuit and terminate the welding operation.

1 Claim, 3 Drawing Figures

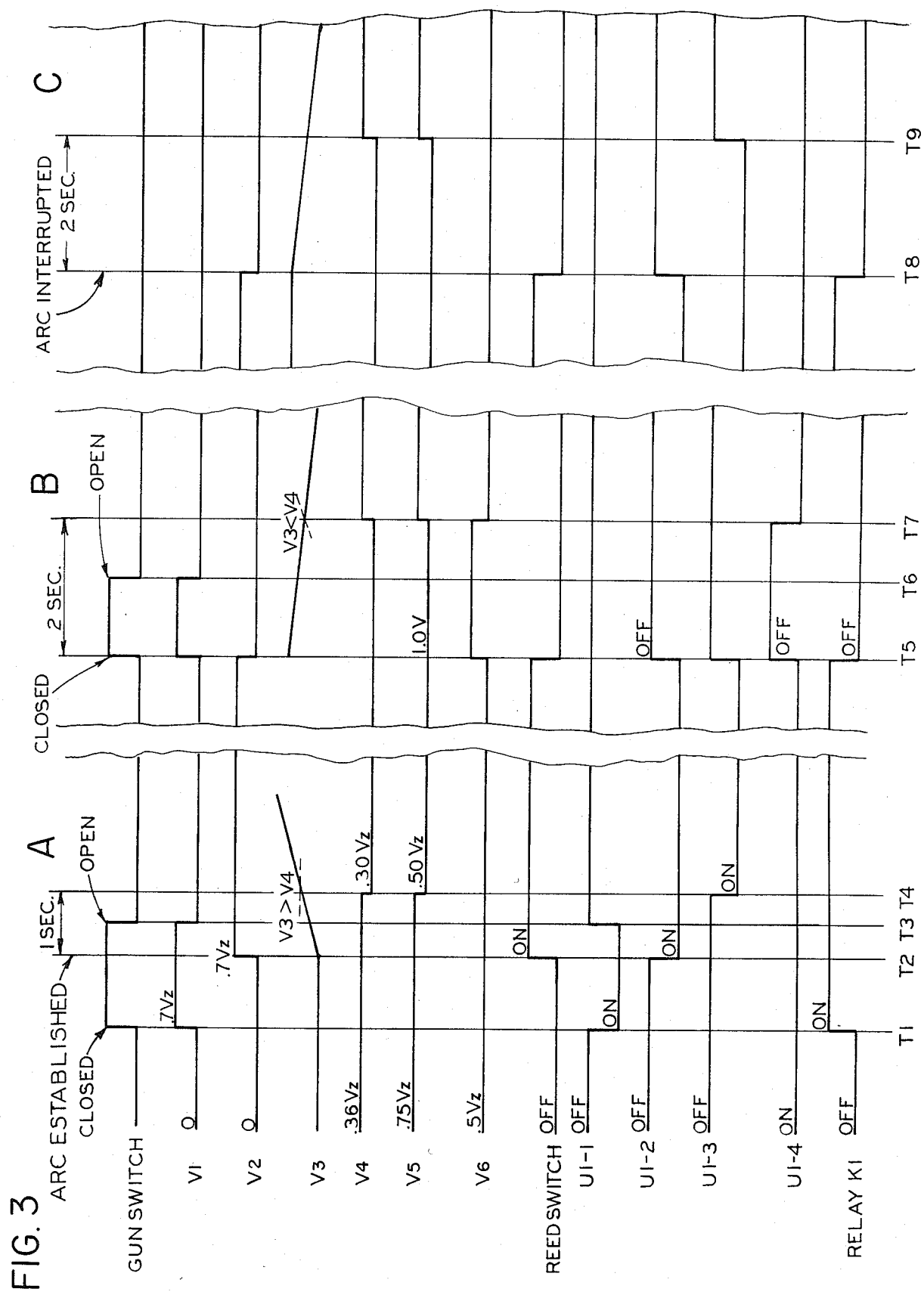

TRIGGER HOLD CIRCUIT FOR WELDING POWER SUPPLY

BACKGROUND OF THE INVENTION

This invention relates to an electrical circuit for use with an electric arc welding system. The circuit is designed so that an operator may momentarily close a switch located on a handheld torch to initiate the welding operation, and he may thereafter release the switch with the welding operation continuing undisturbed. The circuit is failsafe in that it will terminate the welding operation any time the arc is interrupted.

There are two prior art types of systems available which provide a trigger/hold type of circuit of the type described above. The first type uses an alternating relay, or its electronic equivalent, and this circuit merely provides that the first switch closure initiates the welding operation, and the second switch closure will terminate it. One disadvantage of this type of system is that the operator could walk away from the system before terminating the welding operation, and the system would continue to operate, causing serious problems and hazards.

A second type of system utilizes a current sensing relay to latch the system in operation. This type of system overcomes the difficulty mentioned above in that if the operator were to walk away from the system, and the arc interrupted, the welding sequence would be terminated. However, this type of system requires that the arc be terminated in order to discontinue the system, and this normally results in an undesirable length of wire being drawn from the tip of the torch when the operator withdraws the torch from the workpiece to extinguish the arc.

SUMMARY OF THE INVENTION

This invention relates to a control circuit for use with an electric arc welding system. The control circuit is responsive to the closure of a torch mounted control switch to initiate a welding operation, and once an arc has been established, the operator may release the switch, and the welding operation will continue. The welder has a choice of two ways to terminate the welding operation. To terminate the welding sequence, he may either actuate the torch mounted control switch a second time, or he may merely withdraw the torch.

In the preferred embodiment of the invention, a first circuit element senses the initial closure of the torch mounted control switch to initiate the welding sequence, and current sensing means detects when the arc has been established to provide a latch so that the control switch may be released without interrupting the arc. A timer circuit begins its operation after the arc has been established, and after a predetermined time delay, another circuit is activated to sense the subsequent closure of the control switch. Therefore, when the control switch is actuated a second time after the predetermined time delay, the latch is removed, and the welding operation is terminated. Similarly, withdrawing the torch from the work and extinguishing the arc causes the latch to be removed and the welding sequence terminated.

This invention, therefore, has the advantage of providing a fail safe circuit, that is, one where welding operation is automatically terminated whenever the arc is interrupted while allowing the welder the opportunity to weld for long periods of time without requiring him to hold the control switch closed.

Other objects and advantages of the invention will be apparent from the following description, the accompanying drawings and the appended claims.

BRIEF DESCRIPTION OF THE DRAWINGS

FIG. 3 is a representation of waveforms showing the voltage levels at various locations within the circuit of FIG. 2 as well as the status of some of the components at different times during the welding sequence.

DETAILED DESCRIPTION OF THE INVENTION

Figure 1:
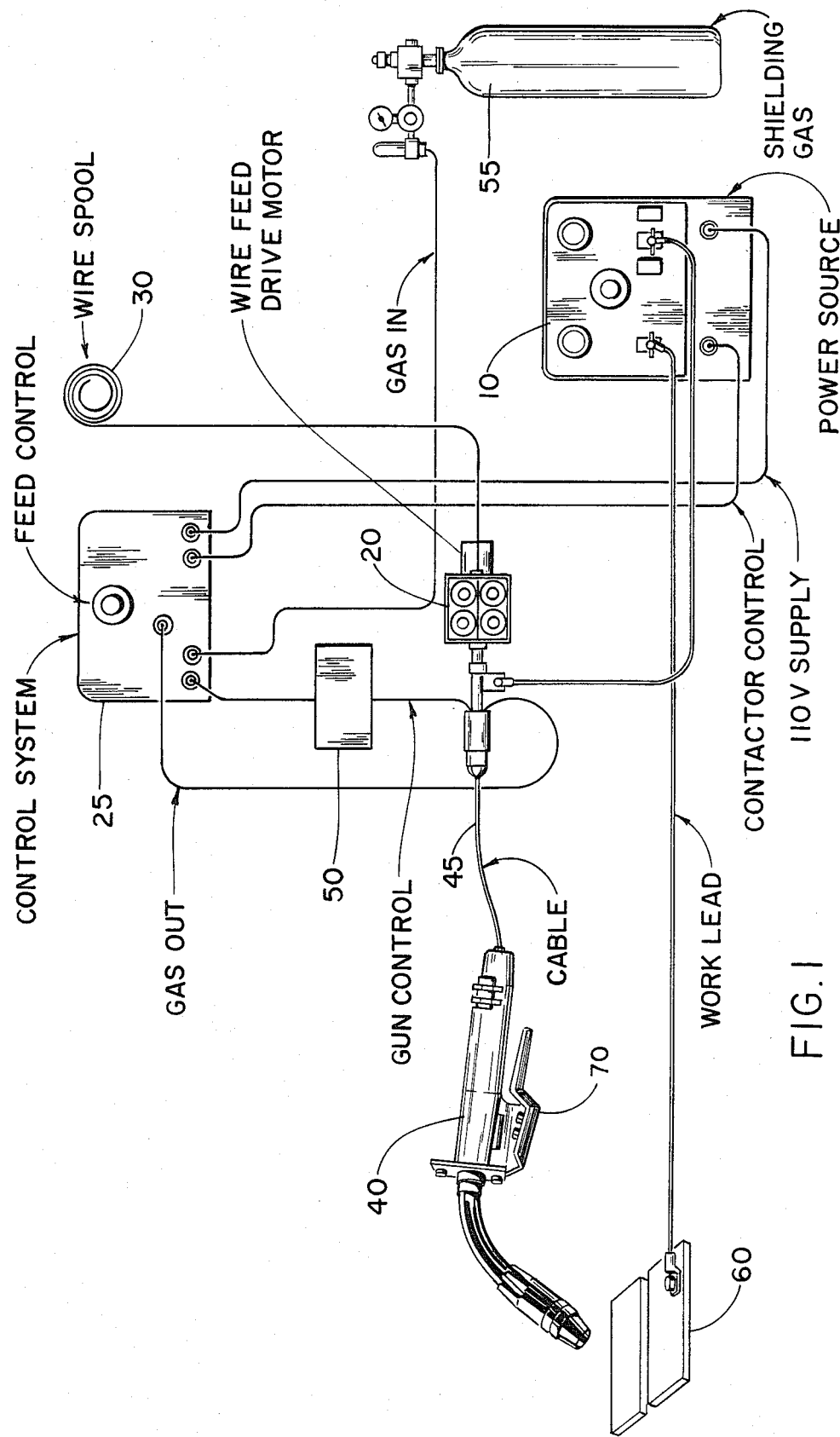
FIG. 1 is a schematic representation of a gas metal arc welding system of the type employing a trigger hold circuit according to the present invention.

Reference is now made to the drawings showing a preferred embodiment of the invention, and particularly, to FIG. 1 which shows a typical gas metal arc welding system including a welding power source 10, an electrode wire feeder 20 and wire feeder control system 25 for controlling the rate at which wire 30 is fed from its source to a weld, a welding torch 40 and cable assembly 45, a trigger hold control circuit 50, a source of shielding gas 55, and workpiece 60.

When the operator depresses a torch mounted control switch or gun switch 70, a welding sequence is initiated. Several things take place, including the opening of valves within the control system 25 to allow shielding gas from source 55 to pass into the cable 45 and be directed toward the workpiece, turning on the wire feed drive motor 20 to supply wire from the source 30, also through the cable 45 to the workpiece, and to turn on the welding power source 10 to provide welding current to the torch. In some welding systems, sequencers or timers are provided to ensure that shielding gas is provided before and after the welding power supply is turned on and off and to control the proper operation of the wire feeding mechanism. The specific sequence circuitry needed for this operation does not form a part of the present invention and is not described in detail.

The present invention, however, is concerned with how the gun switch 70 is used broadly to control the operation of the system. In one mode, the operator or welder holds the gun switch closed during the welding sequence. In another mode of operation, the welder may close the gun switch momentarily to initiate the welding sequence, and after an arc has been established, he may release the switch and continue welding until he again presses the switch or withdraws the torch from the workpiece and extinguishes the arc.

Figure 2:
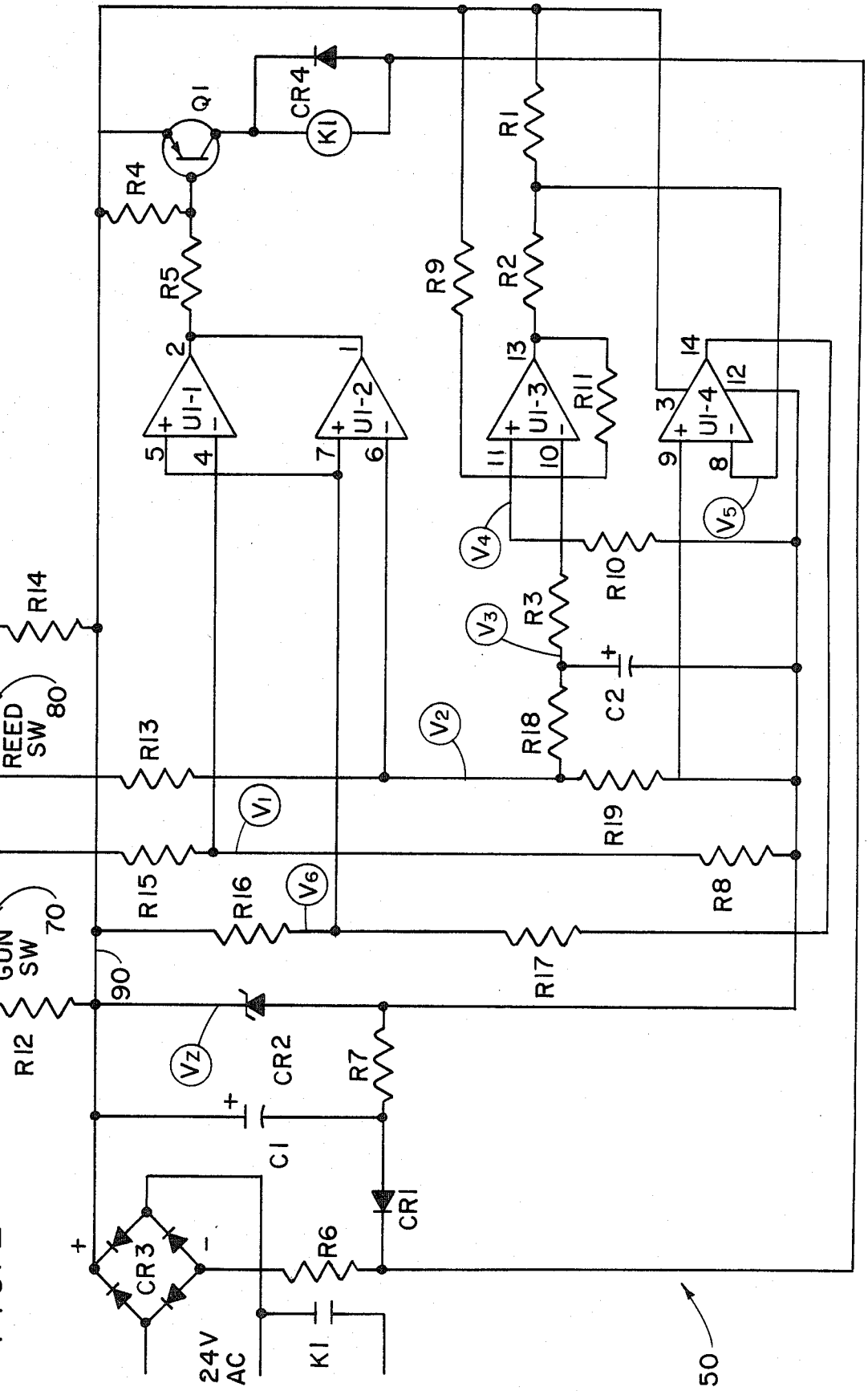
FIG. 2 is an electrical schematic diagram of a trigger hold circuit.

Turning now to FIG. 2, the control circuit 50 is illustrated in detail in the electrical schematic drawing. A power supply is shown in the schematic of FIG. 2 and includes a bridge rectifier CR3, a filter capacitor C1, a zener diode CR2 and a dropping resistor R7. These components make up a filtered regulated section for the control electronics. Unfiltered, nonregulated rectified AC is used to power the relay K1. Diode CR1 prevents the filtered supply from discharging into the unfiltered portion. The regulated supply voltage on line 90 is referred to hereinafter as Vz.

The welding power source 10 will normally include some means for monitoring the flow of welding current, and in the preferred embodiment this is a current sensing device, such as a reed switch, the contacts 80 of which are illustrated in FIG. 2. The control circuit also includes a selector switch 85 by which the welder can select between normal operation of the gun switch 70 or operation of the system in accordance with the present invention.

In normal operation, selector switch 85 is open, current sensing reed switch 80 will be initially open, as will the gun switch 70.

A quad comparator U1 includes four separate comparator circuits U1-1, U1-2, U1-3 and U1-4. The regulated supply voltage on line 90 is connected through resistor R16 to the +inputs of comparators U1-1 and U1-2 and through resistor R9 to the +input of comparator U1-3. Line 90 is also connected through resistor R1 to the +input of comparator U1-4. The other inputs of each comparator are connected to a common point through resistors (not shown) and therefore comparators U1-1, U1-2 and U1-3 are off at the present time, and comparator U1-4 is on.

The comparators U1-1 through U1-4 are off, that is, their output is high whenever the voltage level at the +terminal exceeds the voltage level at the −terminal.

Included in this invention is circuit means responsive to the closure of the torch mounted control switch 70 for energizing the welding power source 10.

When the gun switch 70 is closed, the −input to comparator U1-1 is connected to line 90 through resistors R12 and R15, and the voltage level at V1 will rise immediately to 0.7 Vz volt. The +input to the comparator is connected to a reference voltage source (V6), and since the −input is now higher than the reference input, comparator U1-1 turns on, and through resistor R5 gates transistor Q1 into the conducting state, thus energizing relay K1. The contacts of relay K1 control the welding circuitry of FIG. 1, as explained above.

When the welder releases gun switch 70, the voltage level at V1 returns to 0, and as a result, relay K1 will be deenergized. Thus, operating gun switch 70 in this mode controls relay K1 directly.

When the welder selects the "hold" position of the switch 85, thereby closing it, the current sensing reed switch 80 will be connected in the circuit.

In this mode of operation, when the gun switch 70 is closed at time T1 in FIG. 3, the voltage level at V1 immediately goes to 0.7 Vz volt. This turns on comparator U1-1 and energizes relay K1, as previously described.

This invention also includes means responsive to the monitoring means or reed switch 80 for providing a latch allowing the torch mounted control switch 70 to be released without deenergizing the welding power source after sensing the establishment of welding current.

When an arc is established at time T2, the current flow to the arc will be sensed and as a result, the current sensing reed switch 80 will close. This will cause the voltage level at V2 to change immediately to 0.7 Vz volt.

Comparator circuit U1-2 will be turned on since its −input is now greater than the reference voltage (V6), and since either comparator U1-1 or U1-2 being on will cause relay K1 to be energized, comparator U1-2 effectively provides a latch. In other words, as long as current flows and the current sensing reed switch 80 is closed, relay K1 will be latched. Therefore, gun switch 70 may be released without disturbing the flow of current to the arc.

Also provided is timer means responsive to the monitoring means 80 for providing an output after a first predetermined time delay following the establishment of welding current. A time delay circuit, including resistor R18 and capacitor C2 begins to operate, and the voltage level at V3 will begin to rise as soon as the reed switch 80 closes.

It is required that the gun switch 70 be released before the voltage level V3 reaches the voltage at V4; this is approximately 1 second after the arc has been established. Assuming that the switch 70 has been released at time T3, then the voltage level at V1 returns to 0, comparator U1-1 is turned off, but since comparator U1-2 is on, relay K1 remains energized.

As the voltage at V3 continues to rise, and finally matches and exceeds the voltage at V4 at time T4, comparator U1-3 will turn on, thus providing an output after a predetermined time delay. At this time, the voltage level at V4 changes from 0.36 Vz volt to 0.3 Vz volt, and the voltage level at V5 changes from 0.95 Vz volt to 0.5 Vz volt. Comparators U1-2, U1-3 and U1-4 are now tuned on and comparator U1-1 is turned off.

The invention now provides two ways for terminating the welding operation. One is by the operator again depressing or closing the gun switch 70, and the other is by interrupting the arc, such as by pulling the torch away from the workpiece.

Turning to the first method, this invention includes further circuit means responsive to the output of the timer means and to the subsequent closure of the control switch for deenergizing the welding power source. In other words, closing the gun switch 70 is also a means by which the welding operation can be terminated. This sequence is illustrated in FIG. 3B. When the switch 70 is closed at time T5, the voltage level at V1 again will rise immediately to 0.7 Vz volt, and this will cause comparator U1-4 to turn off since the voltage level at the +terminal (0.70 Vz volt) is greater than the voltage level at the −terminal (0.50 Vz volt). When comparator U1-4 turns off, the reference voltage level at V6, which was 0.5 Vz volt, now increases to 1.0 Vz volts. This causes both comparators U1-1 and U1-2 to be forced off, thereby deenergizing relay K1. Of course, when relay K1 is deenergized, the arc will disappear, the current sensing reed 80 will open, and the voltage at V2 will drop to 0 volts. The voltage at V3 will exponentially decay to 0 as capacitor C2 discharges through resistors R18 and R19.

The operator must release the gun switch 70 while the voltage at V3 exceeds the level at V4. In the present invention, the maximum release time is in the order of 2 seconds. With the gun switch 70 released at time T6, and the voltage level at V3 returning to 0, the circuit returns to its initial configuration. When the voltage level of V3 decreases below the voltage at V4, at time T7, the circuit returns completely to its original state and is ready to begin a new welding sequence.

Considering now the arc interruption method, this invention provides means responsive to the monitoring means 80 for deenergizing the welding power source 10 upon sensing the loss of welding current. Pulling the torch away from the workpiece will cause the current sensing reed switch 80 to open, as shown at time T8 in FIG. 3C, and therefore the voltage at V2 will drop to 0, removing current from relay K1 and discontinuing the welding operation. Removal of current at V2 will allow the voltage at V3 exponentially to decay by the circuit path through resistors R18 and R19. When this occurs at time T9, the circuit of FIG. 2 will be back into the starting condition, and the welding sequence can be repeated.

The components included in the preferred embodiment of the invention illustrated in FIG. 2 include the following:

| | |
|---|---|
| C1 | CAPACITOR, ALUM. ELECT., 22 MFD, 50 VDC |
| C2 | CAPACITOR, TANTALUM, 3.3 MFD, 35 WVDC |
| CR1,CR4 | DIODE, 150 MA, 100 PRV |
| CR2 | DIODE, ZENER, 400 MW, 11 V |
| CR3 | BRIDGE, DUAL-IN-LINE, VM48 |
| K1 | RELAY, SPDT |
| Q1 | TRANSISTOR, AMPLIFIER, SILICON |
| R1,2,10,16,17,19 | RESISTOR, 47K OHM, ¼ W |
| R3,5,13,14 | RESISTOR, 10K OHM, ¼ W |
| R4 | RESISTOR, 2.7K OHM, ¼ W |
| R6 | RESISTOR, 330 OHM, ½ W |
| R7 | RESISTOR, 1K OHM, ½ W |
| R8 | RESISTOR, 4.7K OHM, ¼ W |
| R9 | RESISTOR, 100K OHM, ¼ W |
| R11 | RESISTOR, 470K OHM, ¼ W |
| R12,15 | RESISTOR, 1K OHM, ¼ W |
| R18 | RESISTOR, 1 MEG OHM, ¼ W |
| U1 | INTEGRATED CIRCUIT, QUAD COMPARATOR, LM-339N or EQUIV. |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A control circuit for an arc welder including a welding power source, a torch mounted control switch, and means for monitoring the flow of welding current, the control circuit comprising:

circuit means responsive to the closure of said control switch for energizing the welding power source, said circuit means including a first comparator having one input connected to said control switch and the other input connected to a reference voltage source;

means responsive to said monitoring means for providing a latch, allowing the control switch to be released without deenergizing the welding power source after sensing the establishment of welding current, said means including a second comparator having one input connected to said current monitoring means and the other input connected to said reference voltage source;

timer means responsive to said monitoring means for providing an output after a first predetermined time delay following the establishment of welding current;

further circuit means responsive to the output of said timer means and to the subsequent closure of the control switch for deenergizing the welding power source, said further circuit means including a comparator circuit having one input connected to said control switch and the other input connected to the output of said timer means whereby said comparator circuit will provide an output upon the closure of said control switch after said predetermined time delay, the output of said further circuit means being connected to modify the voltage level of said reference voltage source thereby to disable said first and second comparators upon the subsequent closure of said control switch; and means responsive to said monitoring means for deenergizing the welding power source upon sensing the loss of welding current.

* * * * *

UNITED STATES PATENT AND TRADEMARK OFFICE
CERTIFICATE OF CORRECTION

PATENT NO. : 4,531,045
DATED : July 23, 1985
INVENTOR(S) : Gerrit Vande Kemp

It is certified that error appears in the above-identified patent and that said Letters Patent are hereby corrected as shown below:

On the title page, Item [19], "Kemp" should read -- Vande Kemp --.

Item [75], "Gerrit V. Kemp" should read -- Gerrit Vande Kemp --.

Col. 2, line 13, "Fig 3 is a representation of waveforms" should read --Figs. 3A-3C are waveform diagrams--.

Col. 3, line 17, "+" should read -- - --.

Col. 4, line 24, "tuned" should read --turned--.

Col. 5, line 7, "inventionillustrated" should read --invention illustrated--.

Signed and Sealed this

Twenty-eighth Day of February, 1989

Attest:

DONALD J. QUIGG

Attesting Officer

Commissioner of Patents and Trademarks